Nov. 1, 1938.  H. J. CRINER  2,134,684
BREAD SLICING MACHINE
Filed March 1, 1937   2 Sheets-Sheet 2
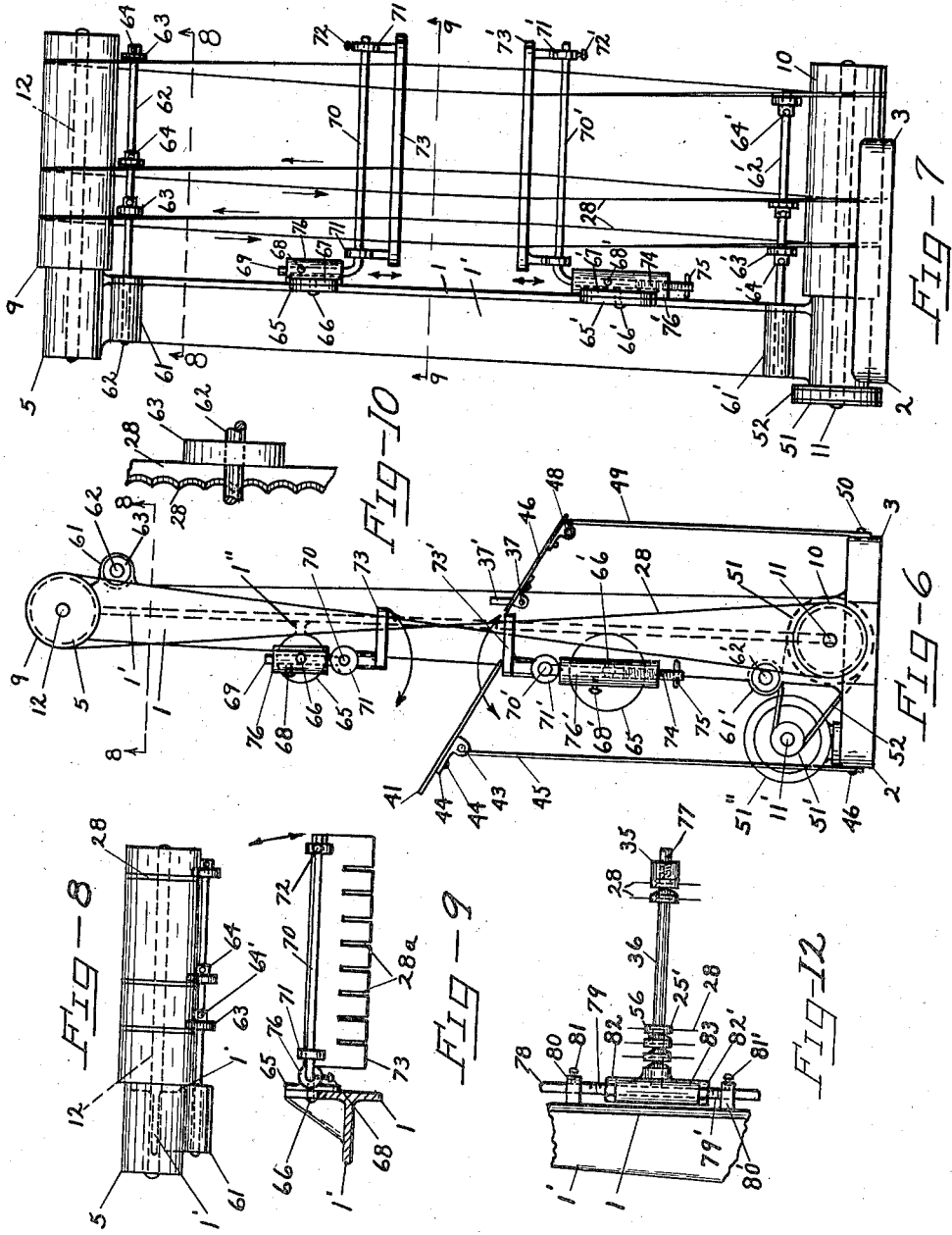
INVENTOR.
Harry J. Criner
BY Bush + Bush
ATTORNEYS.

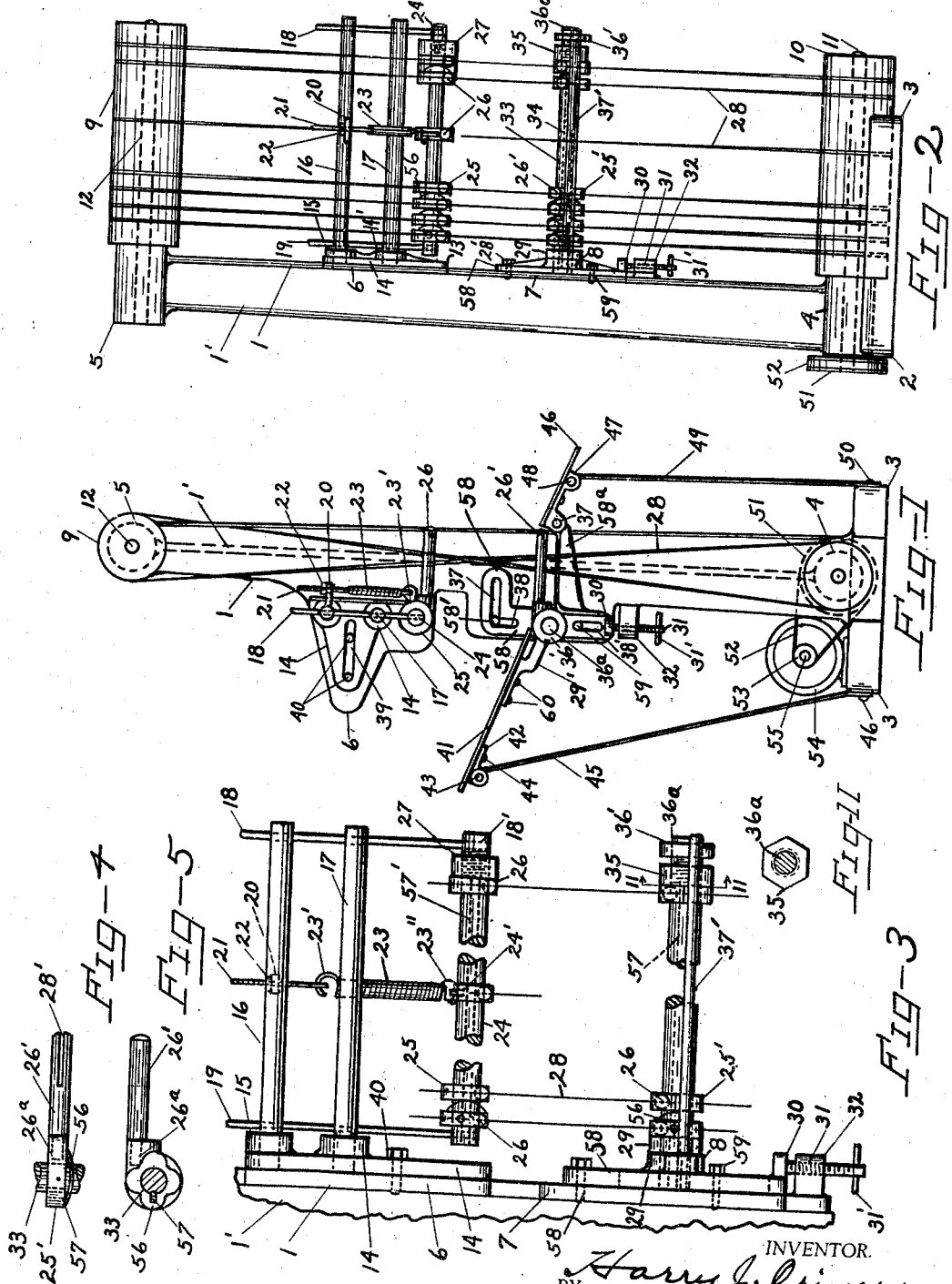

Patented Nov. 1, 1938

2,134,684

UNITED STATES PATENT OFFICE 2,134,684

BREAD SLICING MACHINE

Harry J. Criner, Davenport, Iowa, assignor of one-half to A. G. Bush, Davenport, Iowa Application March 1, 1937, Serial No. 128,390

12 Claims. (Cl. 146—88)

My invention relates to improvements in bread slicing machines.

The objects of my invention are, in a multiple-bladed bread slicing machine having guides to simultaneously guide the blades and to support and guide the bread while being sliced, to provide means for readily retracting the guides so as to clear the blades; to provide means for adjusting the guides vertically both relative to the frame and to each other; to provide pivotal means for mounting the guide assemblies by which the entire assembly can be swung away from the blades; to provide means for simultaneously adjusting the lower guide assembly and the adjacent ends of the feed and discharge bread chutes and in a machine having crossed blades to provide means for centering the loaves of bread approximately at the crossing point of the blades; and to provide means for guiding the blades as they approach the pulleys which drive them to equalize the inclination of the blades on opposite sides of the pulleys of a band blade machine.

I attain these objects by the means illustrated in the accompanying drawings, in which,—

Figure 1 is a side elevation of one form of my invention;

Figure 2 is a rear elevation, but with the feed and discharge bread chutes omitted;

Figure 3 is an enlarged detail of the apparatus as shown from the front or left of Figure 1;

Figure 4 is an enlarged detail of one of the guide members with guide finger attached;

Figure 5 is an enlarged detail showing a side view of one of the guide members;

Figure 6 is a side elevation of an alternate form of my machine showing the guide supporting arms pivotally mounted upon the frame;

Figure 7 is a rear elevation of the form of machine shown in Figure 6, but with the bread chutes omitted;

Figure 8 is a detail looking upwardly on the line 8—8 of Figure 7;

Figure 9 is a sectional detail looking upwardly on the line 9—9 of Figure 7;

Figure 10 is an enlarged detail showing the application of a guide roller to the heel of a band-blade;

Figure 11 is a sectional detail showing one of the hex adjusting nuts on the guide assembly bar;

Figure 12 is an enlarged detail showing an alternate method of pivotally mounting a guide assembly upon the frame.

Similar numerals refer to similar parts throughout the several views.

My frame consists of a base 2 with extended feet 3 projecting therefrom far enough to form a firm support for the machine.

Cast integral with or suitably united to the base, is a column 1, preferably T-shaped in section, with the web 1' extending outwardly from the flange. A boss 4 is formed integral with the lower end of the frame 1 and an upper boss 5 is formed integral with the upper end of the frame.

Revolvably mounted in the boss 4 is a shaft 11, on the outer end of which a pulley 51 is mounted, which may be driven by a belt 52 passing over the drive wheel 53 mounted upon the shaft 55 of the motor 54 which may be secured to the base 2, in any desired manner.

In the upper boss 5 a corresponding shaft 12 is mounted. Upon the shafts 11 and 12 I mount cylindrical pulleys 10 and 9, respectively, which carry a plurality of endless band-blades 28, the bands being driven by the pulley 10, and in turn driving the pulley 9. These bands are preferably mounted upon the pulleys in Figure 8 form as shown in Figures 1 and 6, but it is obvious that my invention can be applied to band-blade machines utilizing uncrossed cutting bands and may also be applied to reciprocating blade machines of either the crossed or uncrossed type.

In band-blade machines of the crossed blade type, there is a tendency for the blades to travel in a direct line from the guides to whichever pulley they happen to be approaching, so that the inclination of the blade to accommodate the separation of opposite portions of the blade in the cutting sector takes place as a blade leaves a pulley and travels to the first guide. In order to equalize this inclination on both sides of the pulley, I form bosses 61 and 61' integral with the frame 1, and revolvably mounted in those bosses shafts 62 and 62', respectively.

Upon the shaft 62 I mount collars 64, and adjacent to the collars 64, I mount ballbearing rolls 63, which bear against the heel of the blades and deflect them from the vertical sufficiently to carry them over a distance equal to one-half of the distance between the ascending and descending segments of the blade at the point of crossing. Similar collars 64' with ballbearing rolls 63' are mounted upon the shaft 62' and the collars 64 and 64' may be secured to the shafts by pins or other suitable means as desired.

In the simplest form of my invention, lugs 80 and 80' are formed integral with the web of the column, and are bored out to permit the insertion of the rod 78, which may be readily secured therein by set screws 81 and 81'. Upon the middle portion of the rod 78 between the lugs 80 and 80' I mount revolvable upon the rod 78 the head 83. The rod 78 is threaded as shown at 79 and 79' and hexagonal nuts 82 and 82' are mounted upon the rod 78 to coact with the threads 79 and 79' and by the use of these nuts, the head 83 may be adjusted vertically upon the rod 78 within predetermined limits of travel.

In the head 83 I rigidly mount a shaft 36 which normally extends outwardly parallel to and transversely of the cutting blades and upon the shaft 36 I mount guides 25' which are provided with slotted fingers 26', the inner ends of which 26a are united to the guides 25' by a pressfit or by threading or other desired means.

A slot 28' is formed in the outer end of each finger 26'. These guides are slidably mounted upon the bar 36 and separated by springs 56 as shown in my copending application.

The outer end of the arm 36 is threaded and carries a hexagonal nut 35 threaded thereon and by tightening the nut 35 the pressure upon the springs 56 may be increased so as to compress all of the springs 56 and shorten the distance between the adjacent guides 25', thereby narrowing the spacing of the blades 28 and causing them to cut thinner slices of bread than they would otherwise do.

To adjust the machine to cut thicker slices of bread, the hex nut 35 is turned outwardly upon the shaft 36 and the spring 56 acting upon the guides 25' spread them apart, thus spreading the fingers 26' and expanding the gauge of the cutting blade 28 so that they will cut thicker slices.

It will be observed that this agreement is of great simplicity and will permit adjustment of the blades in either direction while the machine is in full motion, as well as when it is idle.

In Figures 4, 5 and 12, I have shown the guides and fingers in the form preferred for the lower guide assembly in which the fingers 26' support the bread while being sliced. In this form, the upper guide assembly may be similar to and mounted similarly to the lower one, but the fingers will be mounted in the lower portions of the guides so as to form a continuous line with the bottom of the guides.

When necessary to change the gauge upon machines which are provided with the guide rolls 63 and 63', the shafts 62 and 62' may be withdrawn from the bosses 61 and 61' and replaced by other shafts having similar guide rolls spaced to conform to the changed spacing of the guides 25'.

In order to permit the vertical movement of the guide assemblies, I pivot the feed chute 41 upon its support 45 by a pivot 43 and the lower end of the bread chute rests upon the upper portion of the guide assemblies as shown in Figure 1, which shows a bracket 29' one end of which is pivotally mounted upon the shaft 36 and the opposite end of which may be bolted to the feed chute 41.

In the form shown in Figure 6, the lower end of the bread chute may merely rest upon the guide assembly without being pivoted thereto.

When desired to utilize a fixed spacing for the cutting blades, a spacing bar 73' may be pivotally mounted upon a swinging arm 70' as shown in Figure 7, by brackets 71' and secured in place by a set screw 72'. With this form of construction, the guide plate 73' may be swung away from the cutting blades upon the pivoted portion of the bar 70' or as an alternative movement, the plate 73' may be retracted from the cutting blades by swinging it to the left as shown in Figure 6, upon the bar 70' as a pivot.

The form of construction just described, is shown in Figures 6, 7 and 9, and in this form of construction, referring to the lower guide assembly, a face plate 67' is secured by a set screw 66' to an extension 65' formed integral with the frame 1.

A head 76' is cast integral with the face plate 67' and contains a bore in which one end of the bar 70' is slidingly mounted and in which it may be readily secured by a set screw 68'. A screw 74 is threadedly mounted in the lower end of the bore in the head 76' with a handle 75 by which it may be turned when desired to adjust the position vertically of the arm 70' the set screw 68' being loosened when so doing and tightened after the arm 70' has been adjusted to the desired position vertically.

By loosening the set screw 66' the face plate 67' may be revolved so as to carry the arm 70' forwardly from the cutting blades, but still keep it parallel thereto and this will afford a forward and back adjustment for the guide assembly plate 73'.

A similar guide assembly in inverted form, comprising a face plate 67, head 76 and arm 70 may be similarly secured to an extension 65 formed upon the web of the frame 1 and the face plate 67 may be secured to the extension 65 by a set screw 66 or other suitable means.

One end 69 of the bar 70 being bent at right angles to the main portion thereof, may be slidingly mounted in the head 76 and kept in its adjusted position by a set screw 68.

The upper guide assembly may be swung away from the blades and at right angles thereto upon the vetrical portion 69 thereof as a pivot or the guide plate 73 being pivoted to the bar 70 by brackets 71 may be retracted upon the bar 70 as a pivot by loosening the set screw 72.

In this form of apparatus, the brackets 71 are slidingly mounted upon the bar 70 and by loosening the set screw 72 may be withdrawn therefrom and a guide plate having a different spacing for the slots 28a may be placed upon the arm 70.

In Figures 1 and 2, I have shown an alternate form of construction which permits a sliding retraction of the guide assemblies, as well as a sliding vertical adjustment thereof. In this form of construction, a head plate 58 having vertical slots 38 and 38' formed therein, is slidingly mounted upon the frame upon set screws or stud bolts 58' and 59. A lug 32 formed integral with the frame, is located just below the head plate 58 and contains a bore in which is threaded a bolt 31 having a handle 31' by which it can be turned.

A lug 30 is formed upon the lower end of the head plate 58 and the upper end of the bolt 31 bears against this lug 30 so as to adjust the position vertically of the head plate 58.

A hub 29 is formed integral with the head plate 58 and has rigidly mounted therein a shaft 36a, which may be secured by a pressfit or other suitable means. Upon the shaft 36a I mount the guide members 25a and springs 56 as heretofore described with reference to the form shown in Figure 12, and guide assemblies in the two forms being identical.

The arm 29' has one end pivotally mounted upon the shaft 36a and its opposite end secured to the feed chute 41 by bolts or rivets 60. An arm 58a is formed integral with the head plate 58 and extends to the rear of the machine and has rigidly mounted therein a bar 37' upon which a bracket 47 is pivotally mounted, the other end of the bracket being mounted upon a pivot 48 carried by the support 49 the lower end of which is pivoted to one of the feet 3.

A take-off chute 46 is secured to the bracket 47. The lower end of the feed chute 41 is secured by the bracket 29' just above the guide members 25' so that the bread can pass from the feed chute 41 directly upon and over the guides 25' and the fingers 26'.

The entire lower guide assembly may be raised or lowered by the bolt 31 and when the lower guide assembly is raised, the lower end of the feed chute 41 will be raised with it and the upper end of the take-off chute 46 will also be raised correspondingly by the arm 58a.

A horizontal slot 37 is formed in the head plate 58 and when desired, the fingers 26' may be retracted from the cutting blades by sliding the upper end of the head plate 58 forward upon the set screw 58' using the set screw 59 as a pivot. In Figure 1, the fingers 26' and 26 are shown somewhat exaggerated in length and are preferably formed to extend just past the line of travel of the blades.

The permissible vertical travel of the head plate 58 will permit the lower guide assembly to be raised to the necessary distance so that the bread passing over same will be centered at the crossing point of the cutting blades.

An upper guide assembly in somewhat similar form is secured upon the frame as follows:

An extension 6 is formed to the flange of the frame 1. A head plate 14 having a slot 39 formed therein, is slidingly mounted upon the pins or set screws 40 which are secured in the extension 6 of the frame. This head plate 14 has a boss 14' formed integral therewith in which a lower crossbar 17 is rigidly mounted. The crossbar 17 is formed with bores near the opposite ends thereof in which are slidingly mounted guide bars 18 and 19 which travel freely vertically in the bore. A similar upper crossbar 16 is rigidly mounted in a boss 15 formed integral with the head plate 14 near the top thereof and has similar bores on the opposite ends thereof through which the upper ends of the guide bars 18 and 19 are free to travel vertically, but secured against lateral movement.

A lug 20 is formed integral with the crossbar 16 having a threaded bolt 21 secured therein, with a nut 22 threaded thereon. The lower end of the bolt 21 carries the upper end of a tension spring 23 connected thereto by a hook 23' and the lower end of the spring 23 has a hook 23" which engages a ring 24' formed integral with one of the guide members 25 mounted upon the shaft 24.

A plurality of guide members 25 are slidingly mounted upon a shaft 24 the ends of which are rigidly connected to the guide bars 18 and 19. The portion of the shaft 24 near the guide bar 18 is threaded and carries a hex nut 27 threaded thereon by which the guide members 25 may be adjusted laterally. The guide members 25 carry fingers 26 which are similar to the fingers 26' heretofore described. The ends of the fingers 26 are slotted to straddle and guide the cutting blades 28.

The tension upon the spring 23 may be adjusted by the nut 22 so as to permit the upper guide assembly to contact lightly with the loaves of bread as they are fed to the cutting blades, the upper guide assembly being free to float lightly upon the spring 23 and to move vertically with the guide bars 18 and 19.

The head 14 may be moved forwardly upon the pins 40 so as to retract the fingers 26 far enough to clear the cutting blades 28; the fingers 26, the slots 39, and the position of the pins 40 being so proportioned as to permit the head 14 being retracted sufficiently to entirely clear the cutting blades. The bolt 21 is made of sufficient length so as to afford the necessary adjustment to cause the upper guide assembly to bear lightly against the upper surface of the loaves of bread when they are properly centered at the point of crossing of the blades 28.

In the operation of my machine, the cutting bands are driven by the motor in the usual way. The guide assemblies for the cutting bands are adjusted to the proper level by the appliances heretofore described and the motor started. As the bread travels over the lower guide assembly, the upper guide assembly contacts lightly therewith by a floating contact which will readily conform to the ordinary variation in the size of the loaves.

When desired to run a batch of loaves of a different size, the guide assemblies are adjusted to the necessary vertical position to center the loaves at the crossing point of the blades, it being very important to secure proper centering of the loaves.

It will be apparent from the description heretofore given that my invention performs several important functions. It affords means for guiding the blades so as to provide an even inclination of the blades as they approach and leave the cylindrical pulleys. It affords simple means for adjusting the height of both the upper and lower guide assemblies or guide plates so as to properly center the loaves of bread at the crossing point of the blades. It provides for a floating pressure of the upper guides to allow automatically for variations in size of the successive loaves of bread being sliced. It affords a plurality of means for withdrawing the guide assemblies from the cutting blades quickly and facilely when it is desired to remove or to put on a blade or blades. It affords facile means for adjusting the height of the feed and take-off chutes or bread boards and for moving or removing the feed chute when it is desired to change blades. It affords means by which either fixed or adjustable guides may be used.

It is obvious that many changes may be made in the apparatus described without departing from the spirit of my invention and I do not limit my claims to the precise forms of apparatus shown in the drawings.

It is also obvious that my invention may be applied to reciprocating blade machines either of the parallel or crossed blade types and I do not confine my claims to band-blade machines.

I claim:

1. In a bread slicing machine having a plurality of slicing blades and means for supporting and driving them, the combination with upper and lower guide assemblies adapted to guide and space the slicing blades, of means for separately adjusting the position of said guide assemblies longitudinally of the blades and for simultaneously adjusting the spacing of the guides laterally in each assembly respectively.

2. In a bread slicing machine having a plurality of slicing blades and means for supporting and driving them, the combination with a guide assembly adapted to space and guide the slicing blades and to support the bread while being sliced, of means for adjusting the position of said guide assembly longitudinally of the blades and for simultaneously adjusting the lateral spacing of the guides in said assembly, and facile means for retracting the guide assembly from the blades.

3. In a bread slicing machine, the combination with a supporting frame having mounted thereon a plurality of cutting blades with means for supporting and driving the blades, of a supporting arm pivotally mounted at one end only, upon the frame to swing in a plane at right angles to the blades and parallel to the cutting plane of the blades carrying guiding means mounted upon the supporting arm adapted to guide and space the cutting blades when in contact therewith, and means for locking the supporting arm transversely to and parallel with a plane of the cutting blades and with the guides in contact with the blades and for releasing said arm to swing it upon its pivot so as to entirely clear the blades.

4. In a bread slicing machine, the combination with a supporting frame having mounted thereon a plurality of cutting blades with means for supporting and driving the blades, of a pair of adjustably vertically spaced supporting arms each being pivoted upon the frame at one of its ends only and carrying guiding means mounted upon the supporting arms adapted to guide and space the cutting blades when in contact therewith, means for locking the supporting arms transversely to and parallel with the plane of the cutting blades and for releasing said arms and swinging them upon their pivots away from the plane of the cutting blades, and means for adjusting the vertical position of said supporting arms separately.

5. In a bread slicing machine, the combination with a supporting frame having mounted thereon a plurality of cutting blades with means for supporting and driving the blades, of a pivoted head adjustably mounted upon the frame and movable upon said pivot in a plane substantially at right angles to the blades, a supporting arm rigidly united at one end only to said head, and a movable guide assembly pivotally mounted upon said supporting arm adapted to contact with and guide the blades or to be retracted therefrom upon its pivot.

6. In a bread slicing machine, the combination with a supporting frame having mounted thereon a plurality of cutting blades with means for supporting and driving the blades, of a pair of vertically spaced heads adjustably mounted upon the frame, supporting arms rigidly united at one end only to said heads respectively, and movable guide assemblies pivotally mounted upon said supporting arms respectively adapted to contact with and guide the cutting blades or to be retracted therefrom upon their pivotal mountings.

7. A band-blade slicing machine comprising a base having a vertical frame united thereto, upper and lower cylindrical pulleys revolvably mounted in the frame, a plurality of band-blades carried by said pulleys in figure 8 form, upper and lower guide assemblies mounted upon the frame adjacent the pulleys, each having revolvably mounted thereon a plurality of guide rolls equal in number to the slicing blades and adapted to bear against the heels of the blades and guide them respectively as they approach the pulleys, a pair of intermediate guide assemblies adjustably united to the frames adapted to space and guide the blades near the crossing point of the blades, means for adjusting the height of said intermediate guide assemblies relative to the crossing point of the blades and relative to each other, means for retracting the intermediate guide assemblies from the blades, and means for driving the pulleys.

8. A band-blade slicing machine comprising a base having a vertical frame united thereto, upper and lower cylindrical pulleys revolvably mounted in the frame, a plurality of band-blades carried by said pulleys in figure 8 form, upper and lower guide assemblies mounted upon the frame adjacent the pulleys, each having revolvably mounted thereon a plurality of guide rolls equal in number to the slicing blades and adapted to bear against the heels of the blades and guide them respectively as they approach the pulleys, a pair of intermediate guide assemblies adjustably united to the frames adapted to space and guide the blades near the crossing point of the blades, means for adjusting the height of said intermediate guide assemblies relative to the crossing point of the blades and relative to each other, means for retracting the intermediate guide assemblies from the blades, means to adjust the lateral spacing of the intermediate guide assemblies, and means for driving the pulleys.

9. A band-blade slicing machine comprising a base having a vertical frame united thereto, upper and lower cylindrical pulleys revolvably mounted in the frame, a plurality of band-blades carried by said pulleys in figure 8 form, upper and lower guide assemblies mounted upon the frame adjacent the pulleys, each having revolvably mounted thereon a plurality of guide rolls equal in number to the slicing blades and adapted to bear against the heels of the blades and guide them respectively as they approach the pulleys, a pair of intermediate guide assemblies adjustably united to the frames adapted to space and guide the blades near the crossing point of the blades, means for adjusting the height of said intermediate guide assemblies relative to the crossing point of the blades and relative to each other, means for retracting the intermediate guide assemblies from the blades, each of said intermediate guide assemblies comprising a bar having a plurality of guide members slidingly mounted thereon, compression springs interposed between the guide members adapted to exert pressure thereon in opposite directions, each guide member being provided with a slotted finger adapted to contact and guide its corresponding slicing blade, one end of said bar being adjustably united to the frame and the opposite end of the bar having a nut threaded thereon by which the tension upon the springs can be increased or diminished.

10. A band-blade slicing machine comprising a base having a vertical frame united thereto, upper and lower cylindrical pulleys revolvably mounted in the frame, a plurality of band-blades carried by said pulleys in figure 8 form, a pivoted head adjustably mounted upon the frame, a supporting arm rigidly united at one end only to said head, and a movably guide assembly pivotally mounted upon said supporting arm to contact with and guide the blades during the cutting operation, said arm being retractable upon its pivot so as to entirely clear the blades.

11. A band-blade slicing machine comprising a base having a vertical frame united thereto, upper and lower cylindrical pulleys revolvably mounted in the frame, a plurality of band-blades carried by said pulleys in figure 8 form, a pivoted head adjustably mounted upon the frame, a supporting arm rigidly united at one end to said head, and a movable guide assembly pivotally mounted upon said supporting arm adapted to contact with and guide the blades or to be withdrawn from the blades either by rotation upon the assembly pivot mounting or by rotation with the head upon its pivot.

12. A band-blade slicing machine comprising a base having a vertical frame united thereto, upper and lower cylindrical pulleys revolvably mounted in the frame, a plurality of band-blades carried by said pulleys in figure 8 form, a pair of spaced heads pivoted upon the frame and adjustable vertically thereon, supporting arms rigidly united at one end to said heads respectively, and removable guide assemblies pivotally mounted upon said supporting arms respectively and adapted to contact with and guide the cutting blades or to be retracted therefrom either upon their pivotal mountings or by rotation of the spaced heads upon their pivots.

HARRY J. CRINER.